INVENTORS:
M. J. DECHANTSREITER
W. E. BARTLEY
BY: James E. Nilles
ATTORNEY

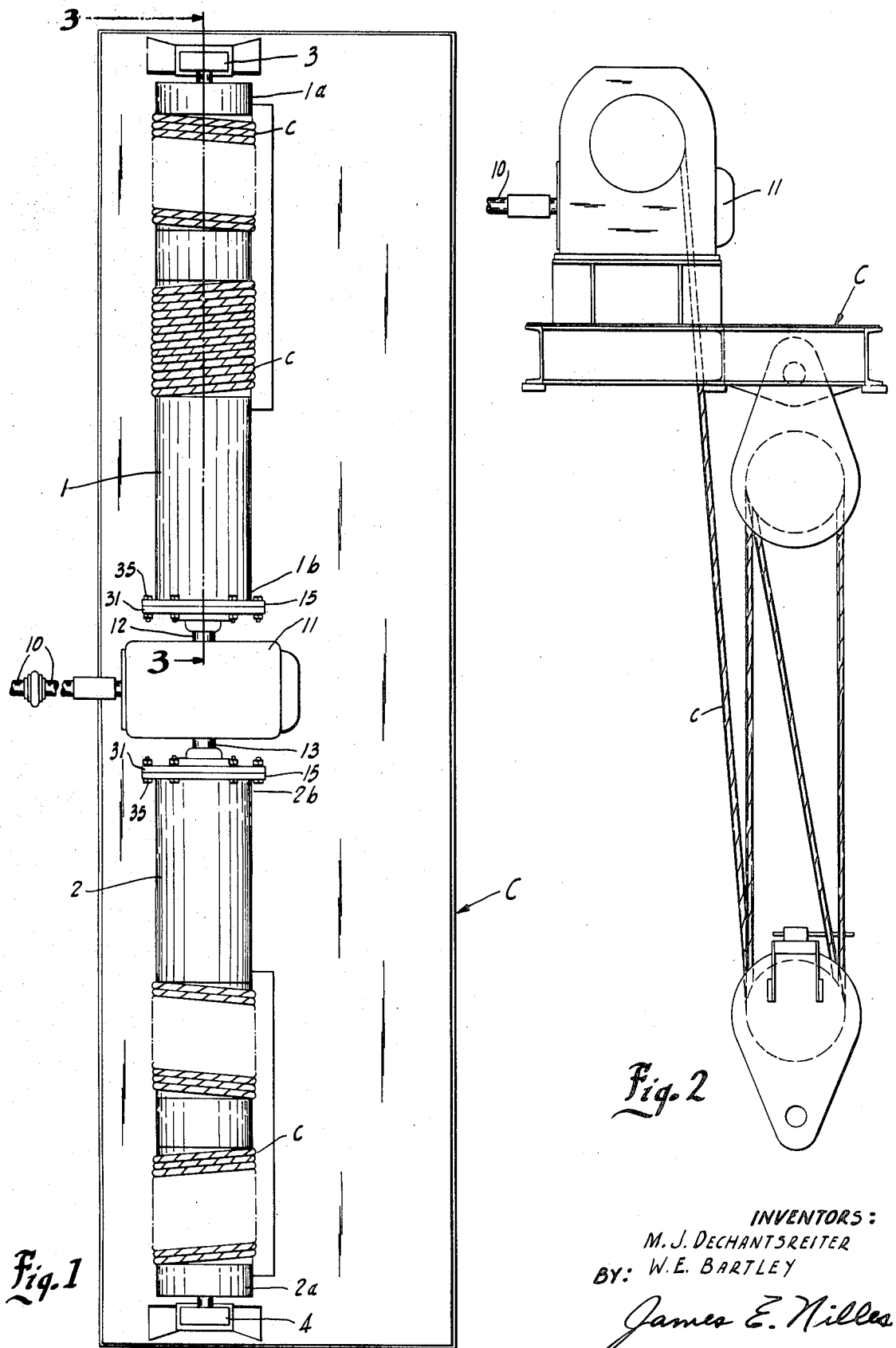

United States Patent Office 3,568,468
Patented Mar. 9, 1971

3,568,468
CABLE DRUM MOUNTING FOR A CRANE
Max J. Dechantsreiter, Milwaukee, and Wilbur E. Bartley, West Bend, Wis., assignors to Harnischfeger Corporation, Milwaukee, Wis.
Filed June 17, 1969, Ser. No. 834,110
Int. Cl. F16d 3/18
U.S. Cl. 64—9                    5 Claims

ABSTRACT OF THE DISCLOSURE

A spherical bearing for mounting one end of a crane cable drum to a power transmission whereby connection between the drum and its driving member can be easily made and which provides for misalignment between the parts.

BACKGROUND OF THE INVENTION

Cranes have cable drums which must be rotatably driven so as to wind the cable around the periphery of the drum and heretofore it has been a considerable problem to make the connection between these large, heavy, and unwieldly cable drums and the power transmission which drives them. Usually, a speed gear reducer mechanism is drivingly connected to one end of the drum and it has been a difficult task to align the gear reducer and the drum in proper power transmitting relationship and provide for misalignment between the parts. These prior art devices often required that the speed reducer unit be partially assembled and generally required considerable effort in assembling the drum and its drive. It was also difficult to make a proper aligned connection between the power transmission and the drum in view of the heavy and cumbersome nature of the parts and furthermore, in view of the fact that a cable drum was connected to opposite sides of the gear reducer which further magnified the alignment problems between the various parts.

SUMMARY OF THE INVENTION

The present invention provides a spherical bearing between the cable drum and the speed reducer of a crane, which bearing also acts to transmit torque from the speed reducer to the drum. Thus, the spherical bearing provides the driving connection between the gear reducer and the drum, accommodates misalignment between the parts, and furthermore facilitates ready assembly of the drum onto the gear reducer.

More specifically, the invention provides a bearing of the above type in which a drum coupling sleeve having arcuately shaped, internal teeth drivingly receives complementary shaped arcuate external teeth on a hub of the gear reducer. The arrangement is such that the coupling sleeve can be pre-assembled on the hub of the gear reducer and then the coupling sleeve can be readily attached to the inner end of the cable drum. Due to the spherical mounting between the gear reducer hub and the coupling sleeve, considerable flexibility in aligning the drum relative to the gear reducer is provided.

BRIEF DESCRIPTION OF THE DRAWINGS

FIG. 1 is a plan view of a portion of a crane showing the invention as applied thereto;

FIG. 2 is a side elevational view of the crane shown in FIG. 1;

DESCRIPTION OF THE PREFERRED EMBODIMENT

Figure 3:
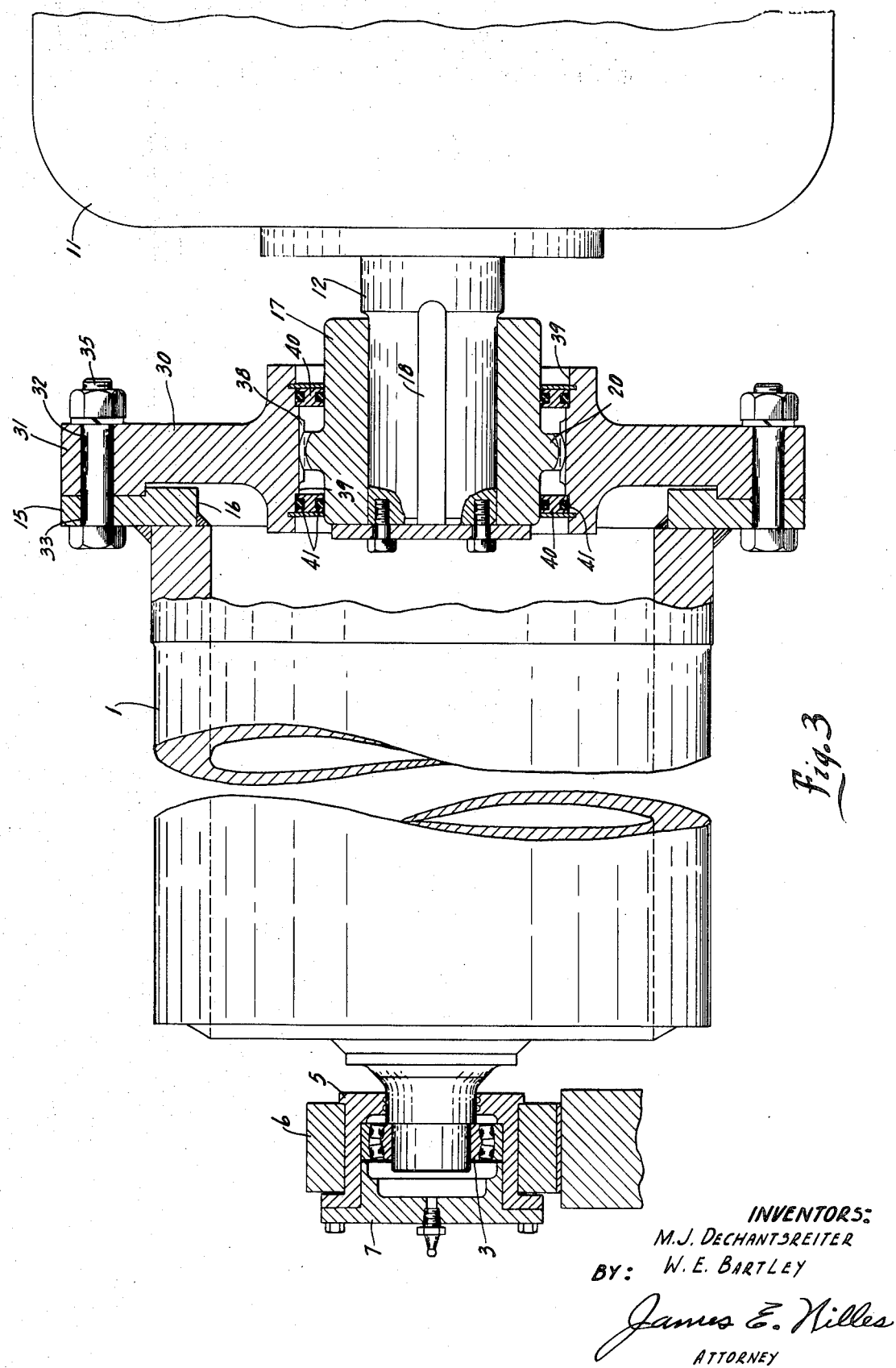
FIG. 3 is an enlarged, fragmentary, longitudinal cross sectional view through a drum shown in FIG. 1, the view taken along line 3—3 in FIG. 1.

The crane C which has been shown as utilizing the invention has cable drums 1 and 2 for the purpose of winding cables c around the periphery of the grooved drum and thereby lifting the load or providing other functions for the crane. Such cranes can utilize any number of drums, and the present invention finds utility when used either with a single drum or a plurality of drums. For purposes of the present disclosure, the invention has been shown and described as utilized with two axially aligned drums 1 and 2 which have outer ends 1a and 2a respectively, that are journalled in a large anti-friction bearing 3 and 4, respectively. The bearings 3 and 4 are conventionally mounted in the bearing retainers 5 carried by the tail bearing locks 6 and having a bearing cap retainer 7 secured to the outer ends of the bearing retainers.

Power is provided from an engine carried by the crane and through the drive shaft 10 into the speed reducer 11. The speed reducer may be of conventional character and it is believed sufficient to say that the reducer has output shafts 12 and 13 extending from opposite sides thereof. The speed reducer 11 is shown as located between the inner ends 1b and 2b respectively of the drums 1 and 2. The output shafts 12 and 13 of the speed gear reducer 11 are connected respectively to the inner ends 1b and 2b of the drums 1 and 2 as follows.

As the connection between the gear reducer output shaft and the drum is the same for either drums 1 and 2, only one will be described.

The drum 1 has an annular flange 15 formed at its inner end and having a large central opening 16. The gear reducer output shaft 12 has a hub 17 fixed thereto by means of a key 18 and this hub has an external set of teeth 20 formed around the periphery of the hub and located intermediate the axial length of the hub. The teeth 20 are arcuately shaped, that is to say they are convex when viewed in section as in FIG. 3.

A drum coupling sleeve 30 is provided between the flange 15 of the drum and the hub 17 and this coupling sleeve includes a flange portion 31 having a series of bolt holes 32 which are alignable with complementary bolt holes 33 of the flange 15. Thus, the coupling sleeve 30 can be detachably, but rigidly secured to the end of the drum by the bolt means 35. The coupling sleeve has a set of internal teeth 38 formed around its central opening 39 and these teeth are arcuately shaped and complement the teeth 20 and teeth 38 from a spherical bearing connection between the coupling sleeve and the hub or more generally, between the drum and the gear reducer shaft 12. With this arrangement, the coupling sleeve can be rocked or tilted relative to shaft 12 and by so permitting the coupling sleeve to tilt, the coupling sleeve can be readily attached to the drum because the alignment between the bolt holes 32 and 33 can be readily made.

Even though the coupling sleeve is tiltable or in effect, rockable on its teeth, a constant and positive driving connection is always maintained between the hub 17 and the coupling sleeve 30.

O-ring retainers 40 having O-rings 41 act to seal the teeth at either side thereof.

The coupling sleeve provided by the present invention assures sufficient flexibility between the drum and the reducer so that they can be readily aligned for attachment or disengagement. Furthermore, it is a relatively easy matter to make the connection even though two drums may be connected to the reducer, one on either side thereof.

We claim:

1. A crane comprising, a cable drum rotatably mounted on said crane, power transmitting means including a shaft extending therefrom and coaxial with said drum and located at one end of said drum, spherical coupling means connecting said one end of the drum to said shaft for sole support of the weight of said end of said drum, said means comprising, a hub fixed on said shaft and having an external set of teeth around the periphery of said hub, said teeth being of generally convex cross section, a coupling sleeve having a central opening and a set of internal teeth formed around said opening, said internal teeth being in driving relationship with said external teeth of said hub, whereby said coupling sleeve can tilt in an axial direction, means for detachably connecting said coupling sleeve to said one end of said drum, and bearing means for rotationally and axially supporting the other end of said drum at a fixed axial location.

2. In a crane having a cable drum rotatably mounted thereon, a power source, a speed reducer driven from said power source, said reducer having an output shaft extending therefrom, a spherical coupling means connecting one end of the drum to said reducer shaft for sole support of the weight of said end of said drum, said means comprising, a hub fixed on said shaft and having an external set of teeth around the periphery of said hub, said teeth being of generally convex cross section, a coupling sleeve having a central opening and a set of internal teeth formed around said opening, said coupling sleeve teeth meshing with and in driving relationship to said external teeth of said hub, whereby said coupling sleeve can tilt within limits relative to said shaft, means for detachably connecting said coupling sleeve to one end of said drum, and bearing means for rotationally and axially supporting the other end of said drum at a fixed axial location.

3. In a crane of the type having a power source, a speed reducer driven from said power source, said reducer having an output shaft extending therefrom, and a cable drum rotatably mounted on said crane, the improvement comprising a spherical coupling means connecting one end of the drum to said reducer shaft for sole support of the weight of said end of said drum, said coupling means comprising a hub fixed on said shaft and having an external set of teeth around the periphery of said hub, said teeth being of generally convex cross section, a coupling sleeve having a central opening and a set of internal teeth formed around said opening, said coupling sleeve teeth meshing with and in driving relationship to said external teeth of said hub, whereby said coupling sleeve can tilt in an axial direction, means for detachably connecting said one end of said drum to said coupling sleeve, and bearing means for rotationally and axially supporting the other end of said drum at a fixed axial location.

4. In a crane having a cable drum rotatably mounted thereon, a power source, a speed reducer driven from said power source, said reducer having an output shaft extending therefrom, a spherical coupling means connecting one end of the drum to said reducer shaft for sole support of the weight of said end of said drum, said means comprising, a hub detachably fixed on said shaft for rotation therewith and having an external set of teeth around the periphery of said hub, said teeth being generally arcuate in axial cross section, a coupling sleeve having a set of internal teeth for driving engagement with said hub teeth, whereby said coupling sleeve can tilt within limits relative to said shaft, means for detachably connecting said coupling sleeve to one end of said drum, and bearing means for rotationally and axially supporting the other end of said drum at a fixed axial location.

5. In a crane having a cable drum rotatably mounted thereon, spherical coupling drive means for detachably connecting one end of said rotatable drum to a drive shaft for sole support of the weight of said end of said drum, said means comprising, a hub detachably fixed on said shaft for rotation therewith, said hub having a set of external teeth around the hub periphery, said teeth being arcuate in axial cross section, a coupling sleeve having a set of internal teeth for driving engagement with said hub teeth, said sets of teeth permitting relative rocking movement between said coupling sleeve and said hub, means for rigidly connecting said coupling sleeve to said rotatable drum, and bearing means for rotationally and axially supporting the other end of said drum at a fixed axial location.

References Cited
UNITED STATES PATENTS 3,511,179    5/1970    Brevnig _____ 64—9

MILTON KAUFMAN, Primary Examiner

R. HEALD, Assistant Examiner

U.S. Cl. X.R.
254—159, 184